United States Patent [19]

Daly et al.

[11] Patent Number: 4,878,650
[45] Date of Patent: Nov. 7, 1989

[54] ARMATURE WITH SHEAR STRESS DAMPER

[75] Inventors: Paul D. Daly, Troy; Mark A. Brooks, Sterling Heights; Robert E. Fallis, Milford; Mark S. Cerny, Sterling Heights, all of Mich.

[73] Assignee: Allied-Signal Inc., Morris Township, Morris County, N.J.

[21] Appl. No.: 188,250

[22] Filed: Apr. 29, 1988

[51] Int. Cl.$^4$ ............................................. F16K 31/06
[52] U.S. Cl. ................................ 251/129.15; 251/50; 335/258
[58] Field of Search ...................... 251/129.15, 53, 50; 239/533.9, 585; 335/258

[56] References Cited

FOREIGN PATENT DOCUMENTS 0221085 12/1983 Japan .............................. 251/129.15
1122856 11/1984 U.S.S.R. ......................... 251/129.15

Primary Examiner—Arnold Rosenthal
Attorney, Agent, or Firm—Russel C. Wells; Markell Seitzman

[57] ABSTRACT

An electro-mechanical fuel injector comprising: a housing and valve seat including a valve setting surface and a metering orifice disposed at a lower end of the housing. An armature assembly is movable relative to the valve seating surface for opening and closing the metering orifice and includes an armature and a pin extending therefrom and adapted to engage the seating surface; a coil assembly and spring are provided to move the armature assembly in a direction to open and close the metering orifice. The injector includes a fluid chamber defined upstream of the metering orifice, in surrounding relation to a portion of the armature assembly. A damping assembly is also provided, movable with the armature assembly, for generating a viscous shear damping force by interacting with the wall of the chamber.

25 Claims, 2 Drawing Sheets

ARMATURE WITH SHEAR STRESS DAMPER

BACKGROUND AND SUMMARY OF THE INVENTION

The present invention relates in general to means for controlling the bounce or rebound motion of an armature and finds use in high performance fuel injectors.

In general, a solenoid valve comprises an armature movable between first and second positions. The extremes of the these first and second positions are often defined by mechanical stops. Armatures, as is known in the art, are moved in one direction by a electro-magnetic force generated by a coil of wire and often moved in the opposite direction by a return spring. When the armature impacts a stop it bounces. Bounce or rebound is detrimental especially if the solenoid is to be used as a positioning device because desired position cannot be maintained, or if the solenoid is incorporated within a fuel injector wherein when the armature moves toward or away from a valve seat due to bounce or rebound more or less fuel, as the case may be, will be ejected from the fuel injector. The bouncing continues until the hysteresis losses in the armature and/or stop finally cause the armature to come to rest. As can be seen, the bounce of an armature effects the operation of a fuel injector by: prolonging or shorting the duration of injection, causing non-linearility in calibration, excessive wear about the valve seat area, poor and variable atomization of the ejected fuel, a lack of repeatability in the operation of the injector over its useful life and a cycle-to-cycle variation in the performance of the injector.

In view of the above, it is the primary object of the present invention to provide means for damping the motion of an armature to lessen and/or totally eliminate bounce. A further object of the invention is to eliminate bounce-through the use of an energy absorbing device. A further object of the invention is to dampen armature motion by generating a viscous shear force.

Accordingly the invention comprises a mechanism for damping the motion of an armature and may be incorporated within an electro-mechanical fuel injector comprising: a housing and valve seat including a valve seating surface and a metering orifice disposed at a lower end of the housing. An armature assembly is movable relative to the valve seating surface for opening and closing, the metering orifice, and includes an armature and a Pin extending therefrom and adapted to engage the seating surface. The fuel injector additionally includes means for moving the armature assembly comprising: a coil assembly comprising a coil and a stator magnetically coupled therewith, and when activated operative to move the armature assembly in a direction to open the metering orifice; and bias means (46) for urging the armature assembly in a direction to close the metering orifice. A fluid chamber defined upstream of the metering orifice, in surrounding relation to a portion of the armature assembly; and means are additionally provided, movable with the armature assembly, within the fluid chamber, for generating a viscous force to damp the motion of the pin by dissipating energy from a collision of said armature means with the seating surface.

Many other objects and purposes of the invention will be clear from the following detailed description of the drawings.

DETAILED DESCRIPTION OF THE DRAWINGS

Figure 1:
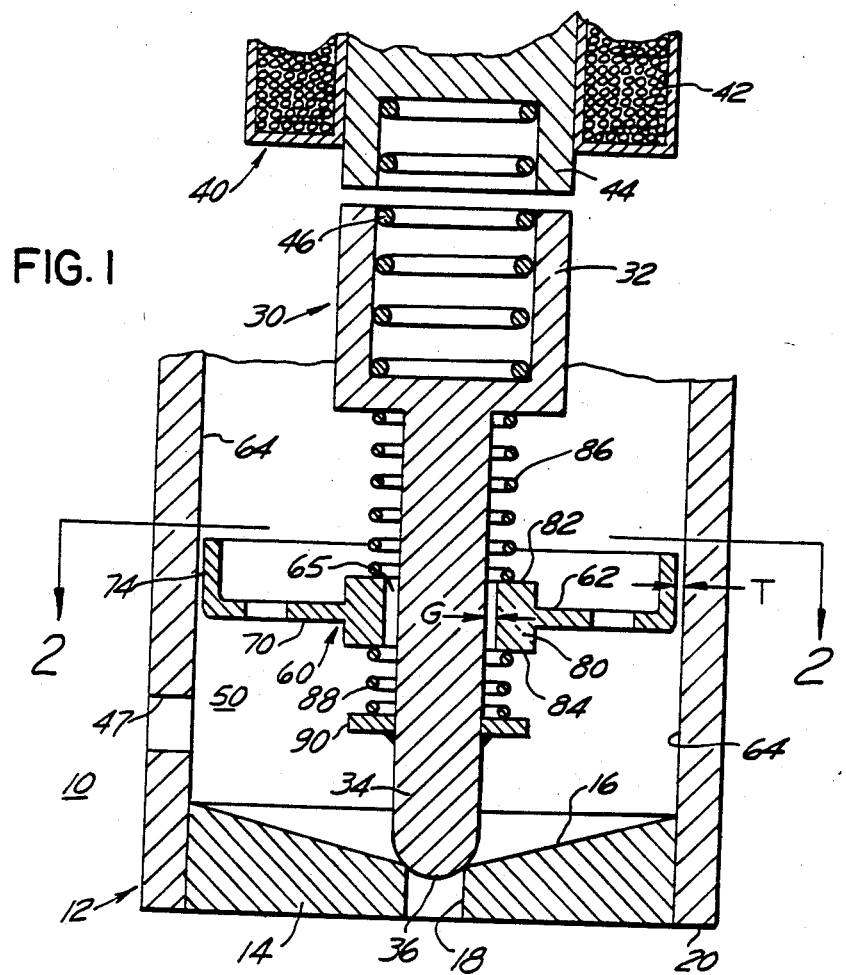
FIG. 1 diagrammatically illustrates a fuel injector incorporating the present invention.

FIG. 1 illustrates an electromagnetic fuel injector 10 comprising a housing 12 and a valve seat 14 disposed at a lower end 20 of the housing 12. The valve seat may be formed as an insert received into the housing 12 or integral therewith. The valve seat 14 defines a metering orifice 18. As illustrated in FIG. 1, the seating surface 16 of the valve seat 14 is substantially conically shaped. The fuel injector includes an armature assembly 30 movable in relation to the valve seating surface 16 for opening and closing the metering orifice 18. The armature assembly 30 further includes an armature 32 and a narrow pin 34 extending therefrom and adapted to engage the seating surface 16 proximate the metering orifice. Preferably the engagement end 36 of the pin 34 is spherically shaped.

The fuel injector 10 further includes means for moving the armature assembly 30 comprising a coil assembly 40 including a coil 42 and a stator 44 magnetically coupled therewith. Means are provided to receive fuel into a fuel chamber 50, formed in the housing 12, which may include a bottom feed inlet 47 or other arrangement as known in the art. The above mentioned armature assembly 30 may further include a spring 46 for urging the armature 32 and pin 34 in a direction to close the metering orifice. The pin 34 and armature 32 may be received within the fluid chamber 50 upstream of the metering orifice 18. A damping assembly 60 including a cup-shaped element 62 is movable with the armature assembly and spaced from the walls 64 of the fluid chamber 50 to generate a viscous force therebetween. The cup-shaped element 62 further includes a central opening 65 into which the pin is received. As can be seen from FIG. 1, the cup-shaped element 62 comprises an annular structure having a base 70 which includes the first opening 65. A circumferential edge 74 extends axially from the base 70 and is spaced from the walls a distance, T, sufficient to develop a shearing action of the fluid therebetween. It is preferable that the length of the circumferential edge 74 be at least .25 of the diameter of the element 62. In this manner, sufficient damping is achieved and additionally the cup 62 will be prevented from assuming a significant angular orientation relative to the axis of the fuel injector. It is preferable that the spacing, G, between the cup and the pin 34 is larger than the spacing, T. Typical of the spacings T and G are 0.002 inch (0.08 mm) and 0.005 inch (0.127 mm). The bottom or base 70 may further include a plurality of openings 76. The openings 76 are sized such that as the cup moves axially they do not create a significant pressure drop thereacross. The primary function of the openings 76 is to permit fluid flow through the chamber 50. The base or bottom 70, proximate the opening 65, includes an enlarged inner wall 80 defining upper and lower annular surfaces 82 and 84 for receipt of springs 86 and 88. Spring 86 biases the element 60 against a lower portion of the armature 32. The second spring 88 biases the cup-shaped element against a securement or ledge 90 formed in the pin 34. It may be optionally desirable to utilize springs 86 and 88 of differing spring constants. As an example, the upper spring 86 may have a weaker spring constant than the lower spring 88. As an example, the spring constant of the lower spring 88 may be in the vicinity of 4–6 lbs/inch (71–107 Kg/m) while the upper spring may have a spring constant of less than 1 lb/inch (17.8 Kg/m).

The fuel injector is illustrated in its closed position in FIG. 1. In response to electric signals received at a coil 42, the armature 32 is drawn toward the stator 44 thereby raising the pin 34 off from the seating surface 16 to permit fuel flow out from the chamber 50 through the metering orifice 18. Upon termination of the electronic signal, the spring 46 will urge the pin downwardly to seal the metering orifice 18. As the pin 34 is moved upwardly or downwardly, the cup-shaped element 62 will follow its motion. By virtue of the narrow spacing between its circumferential edge 74 and the walls 64 a frictional shear force will be developed at the boundary therebetween. Upon collision of the pin 34 with the seating surface 16 during closure, the pin 34 will ave a tendency to bounce. The upward motion of pin 34 is communicated to the element 62 through the lower spring 88. Correspondingly the friction shear force generated between the cup 62 and wall 64 is communicated to the pin 34 through spring 88 which quickly dampens the motion of the pin preventing it from bouncing.

Figure 2:
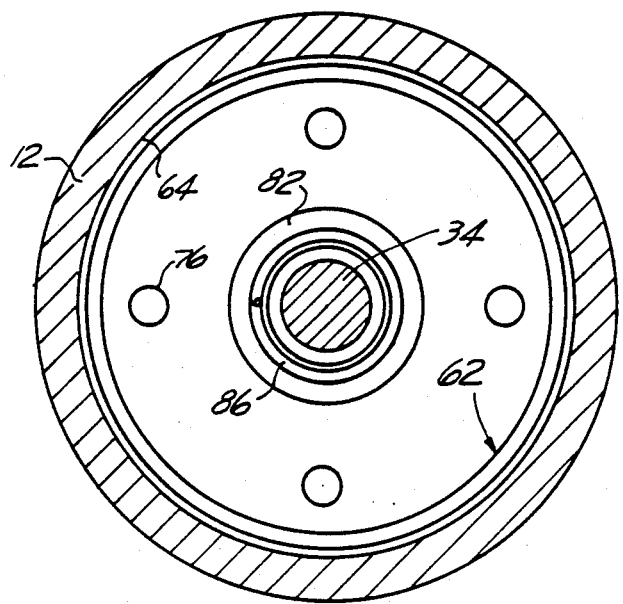
FIG. 2 is a cross-sectional view taken through 2—2 of FIG. 1.
Figure 3:
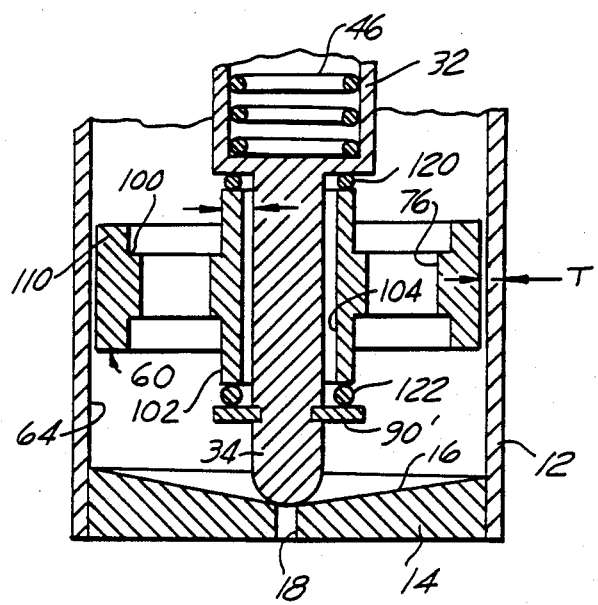
FIG. 3 illustrates an alternate embodiment of the invention.

FIG. 3 illustrates an alternate damping assembly 60'. The assembly 60' includes a circular member 100 extending radially from a hollow cylindrical member 102. The circular member 100 includes a plurality of openings 76 similar to those shown in FIGS. 1 and 2. The cylindrical member 102 includes a central bore 104 into which is received the pin 34 with an edge spacing of G. Axially extending from and circumferentially placed about the circular member 100 is an annular member 110. As illustrated the annular member 110 extends above and below the circular member 100 to increase the contact area with the wall 64. As shown the various members 100, 102 and 110 are of integral construction.

The annular member 110 is closely spaced, T, relative to the wall 64 to generate a viscous shear force by reacting with the fuel or fluid therebetween. The cylindrical member 102 is carried by the armature 32 and pin 34 and secured thereto by upper and lower O-rings 120 and 122 and a snap ring 90'. It is preferable, though not a requirement of the invention, that both O-rings be lightly compressively loaded. It is believed that an acceptable spring constant of the O-rings to be about 100 lb/in (1780 Kg/m) for minute deflections. Typical of the O-rings used are AS-568-003/BN 70 manufactured by Parker Hannifan or Apple Rubber Products, Inc.

In addition, it has been found that effective damping of the rebound of the pin 34 occurs if the ratio of the length of the annular member 110 to the diameter D of the entire assembly 60' is approximately 0.33. Further, it has been found that for a fixed physical size of the damping assembly 60' improved damping occurs by reducing the mass of the assembly 62'. More specifically in the tests conducted, a ratio of assembly weight to armature weight of approximately 0.1 to 0.15 yielded improved results. As an example, in these tests the weight of the assembly 60' was approximately 0.17g as compared to an armature assembly weight of 1.8g.

Many changes and modifications in the above described embodiment of the invention can, of course, be carried out without departing from the scope thereof. Accordingly, that scope is intended to be limited only by the scope of the appended claims.

We claim:

1. An electro-mechanical fuel injector comprising:
   a housing and valve seat including a valve seating surface and a metering orifice;
   an armature assembly movable relative to the valve seating surface for opening and closing, the metering orifice, including an armature adapted to engage the seating surface;
   means for moving the armature assembly comprising:
   a coil assembly comprising a coil and a stator magnetically coupled therewith, and when activated operative to move the armature assembly in a direction to open the metering orifice;
   and bias means for urging the armature assembly in a direction to close the metering orifice;
   a fluid chamber, including a wall, defined upstream of the metering orifice, in surrounding relation to a portion of the armature assembly;
   means, resiliently coupled with the armature assembly, within the fluid chamber, including an element spaced from the wall of the fluid chamber for generating a viscous shear force therebetween and in concert with resilient means for preventing the bounce or rebound of the armature;
   means for resiliently supporting the element relative to the armature means.

2. The device as defined in claim 1 wherein the resilient coupling includes springs extending above and below the element.

3. The device as defined in claim 2 wherein the springs include O-rings.

4. The device as defined in claim 3 wherein the O-rings are lightly biased between the armature and a retaining means carried by the pin.

5. The device as defined in claim 2 wherein the element comprises a central portion received about the pin and a plurality of openings.

6. The device as defined in claim 3 wherein the element comprises a cylindrical member defining a bore, disposed about the pin, including ends engaging respective ones of the O-rings, a central member radially extending from the cylindrical member and an annular member circumferentially engaging the central member, and narrowly spaced from the wall.

7. The device as defined in claim 6 wherein the annular member extends beyond the central member.

8. The device as defined in claim 7 wherein the ratio of the length the annular member, proximate the wall, to the diameter of the element, across the annular member is between 0.25 and 0.33.

9. The device as defined in claim 8 wherein the spacing between the annular member and the wall is nominally 0.002 inch (0.05mm).

10. The device as defined in claim 2 wherein the element comprises an annular structure comprising a base including a first opening slidably received about the armature, and an axially extending circumferential edge spaced from the wall a distance sufficient to develop a shearing action of fluid therebetween.

11. The device as defined in claim 10, wherein the spacing between the circumferential edge and the wall is nominally 0.002 inch (0.05mm).

12. A device comprising an armature movable in a first and second direction within a fluid filled chamber;

means for providing a motion stop in at least said first direction;

means for moving said armature in said first and said second directions; and means attached to and movable with said armature for generating a viscous shear force by interacting with the fluid at a wall of the chamber to damp the rebound motion of said armature after same has collided with said stop means wherein the damping means includes an element resiliently coupled to the armature and viscously coupled to the wall such that as the element moves relative to the wall the viscous force is generated.

13. The device as defined in claim 12 wherein the element comprises an annular structure comprising a base including a first opening slidably received about the armature, and circumferential edge axially extending beyond the base and spaced from the wall a distance sufficient to develop a shearing action of fluid therebetween.

14. The device as defined in claim 13 wherein the base includes holes sufficiently sized so as not to produce a significant pressure drop thereacross.

15. The device as defined in claim 14 wherein the spacing between the first opening and armature is less than the spacing between the circumferential edge and wall.

16. The device as defined in claim 15 wherein the diameter of the first opening is approximately 0.005 inch (0.127mm) greater than the diameter of the armature.

17. The device as defined in claim 16 wherein the element edge is typically spaced 0.002 inch (0.0508mm) from the inner wall of the chamber.

18. The device as defined in claim 17 wherein the ratio of diameter of the element to the length of the edge is greater than 0.25.

19. The device as defined in claim 12 wherein the element is coupled by springs to the armature.

20. The device as defined in claim 19 wherein the element is coupled by resilient O-rings to the armature.

21. The device as defined in claim 20 wherein the O-rings are lightly biased between the armature and a retaining means carried by the pin.

22. The device as defined in claim 21 wherein the element comprises a cylindrical member defining a bore, disposed about the pin, including ends engaging respective ones of the O-rings, a central member radially extending from the cylindrical member and an annular member circumferentially engaging the central member, and narrowly spaced from the wall.

23. The device as defined in claim 22 wherein the annular member extends beyond the central member.

24. The device as defined in claim 23 wherein the ratio of the length the annular member, proximate the wall, to the diameter of the element, across the annular member is between 0.25 and 0.33.

25. The device as defined in claim 24 wherein the spacing between the annular member and the wall is nominally 0.002 inch (0.05mm).

* * * * *